No. 863,859. PATENTED AUG. 20, 1907.
LA FAYETTE LILLARD.
PNEUMATIC BUTTER SEPARATOR.
APPLICATION FILED APR. 12, 1906.
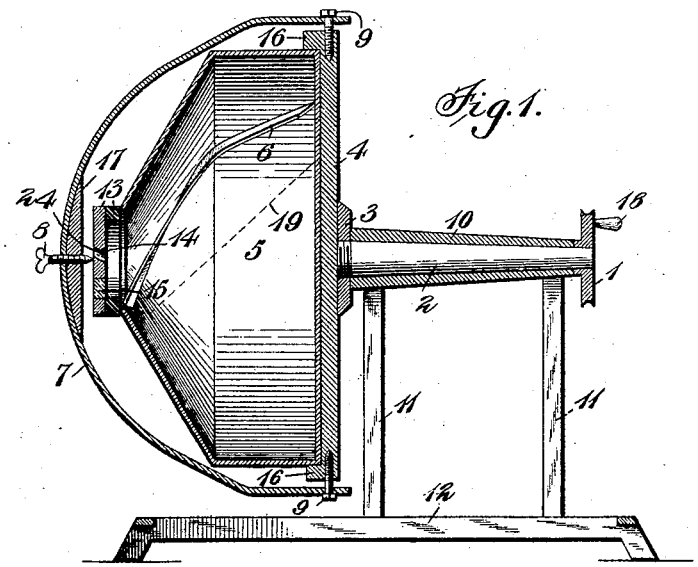
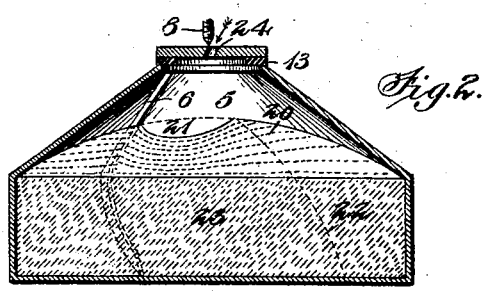
Witnesses:
P. W. Ashworth
Richard Darrah
Inventor:
La Fayette Lillard

UNITED STATES PATENT OFFICE.

LA FAYETTE LILLARD, OF BOOTJACK, CALIFORNIA.

PNEUMATIC BUTTER-SEPARATOR.

No. 863,859.      Specification of Letters Patent.      Patented Aug. 20, 1907.

Application filed April 12, 1906. Serial No. 311,315.

*To all whom it may concern:*

Be it known that I, LA FAYETTE LILLARD, a citizen of the United States, residing at Bootjack, in the county of Mariposa and State of California, have invented a new and useful Pneumatic Butter-Separator, of which the following is a specification.

My invention relates to improvements in pneumatic butter separators in which narrow spiral ribs secured to the inside concave surface of a metallic bowl revolving about a horizontal axis operate in conjunction with the gravity of the cream; and the object of my improvements is to pass atoms of air upward through the cream. I attain this object by the mechanism illustrated in the accompanying drawing, in which Figure 1 is a vertical section of the entire separator. Fig. 2 is a horizontal section of revolving separator bowl (showing the pneumatic process.)

Similar figures refer to similar parts throughout the several views.

The bearing 10 and standards 11, 11 and base 12 constitute the framework of the separator. In bearing 10 turns the shaft 2 carrying a metallic separator bowl 5 to the inner concave surface of which are soldered two or more narrow spiral ribs 6. Crank pulley 1 is secured to small end of tapering shaft 2 which is screwed into flange 3. A circular wooden plate 4 with annular rib 16 is bolted to said flange. Spring bow 7 hinges with plate 4 on two screw bolts 9, 9; said spring bow is stiffened in the middle by a wooden block 17; thumbscrew 8 with bow spring 7 holds cover 14 gasket 13, bowl 5 and plate 4 together as shown. There should be one spiral rib 6 for every 7 or 8 inches of diameter; each rib should be from $\frac{1}{8}$th to $\frac{1}{4}$ in. wide according to speed of bowl; the bottom end of said rib should taper to a point to avoid swinging cream around with the bowl.

When bowl 5 revolves in the right direction a drop of still cream should come in contact with rib 6 at an angle of 45 degrees and be deflected towards bottom of said bowl. If the speed of said bowl be right, the surface of the cream will be supported on an inclined plane as represented by the dotted line 19.

20 is front edge of cream.

23 is the cream itself.

24 is an air hole in center of cover 14 and in line with the axis of motion, see Fig. 2.

The surface of the cream 23 is supported on an inclined plane by the driving-back action of wing 6.
The rapidly moving wing 6 opens the aperture 21 behind said wing and under the front edge of cream, 20.

As the cylinder end of wing 6 moves from four to six times as fast as the end projecting above the cream, the air is rapidly drawn through the aperture 21 forming the air space outlined by the dotted line 22 in the rear and the submerged portion of wing 6 in front. When the air current passes through the aperture 21 and comes in contact with the cream above said air current, atoms of air rise up into the cream breaking the butter loose from the milk.

As shown by Fig. 1, the bowl 5 has a flat bottom a cylindrical part and a conical part. The depth of the cylindrical part should be one-fourth of the diameter, total depth of bowl one half its diameter. The diameter of the mouth should be $3\frac{1}{2}$ in. in all sizes. The bowl 5 is made in this shape for four reasons—first, the bowl makes a good balance wheel, 2nd the large diameter makes it a good blower; 3rd the bowl being very short needs no bearing at the mouth end; 4th the end of rib 6 being so close to the axis of motion, is continually in contact with the air. The crank pulley 1 should be about $\frac{1}{4}$ diameter of bowl.

The shaft 2 Fig. 1 may be driven by a sewing machine belt passing round the pulley 1, or it may be driven by hand with crank handle 18.

Fill bowl 5 about $\frac{1}{2}$ or $\frac{3}{4}$ full of cold cream; turn rapidly (but not fast enough to swing cream around with bowl) until cream is well granulated, as will be shown by little specks of butter on glass gage 15; then set separator on a warm stove—the colder the cream the hotter the stove should be—keep turning to produce an even increase in temperature. The granulated cream will be its own thermometer, for as soon as it is warm enough butter will gather in a fraction of a minute.

I am aware that air churns are made; but they make air bubbles; air bubbles come to the surface too quickly; they are like a strong blast that carries wheat and chaff away together.

I claim

1. The combination in a pneumatic butter separator of a suitable frame, a crank pulley, a tapering shaft, a circular plate with annular rib, a separator bowl with spiral ribs or ribs partly straight and partly spiral secured to the inside concave surface, a cover with air hole in the center and in line with the axis of motion and a spring bow clamp all substantially as set forth.

2. The combination in a pneumatic butter separator having a cylindro-conical bowl revolving about a horizontal axis and spiral ribs or ribs partly straight and partly spiral secured to inner concave surface, and a cover with air hole in the center and in line with the axis of motion substantially as set forth and described.

3. In a pneumatic butter separator a rib or a wing running straight down or spirally down the conical end of the bowl and continuing spirally along cylindrical part and tapering to a point at the bottom of the bowl, substantially as illustrated and described.

4. In a pneumatic butter separator, the combination of a cylindro conical bowl with mouth at cone-end and narrow wings secured to inner face of said bowl and a cover with air hole in the center and in line with the axis of motion substantially as set forth.

5. In a pneumatic butter separator a cylinder conical at one end having an air hole in the center of cover and in line with the axis of motion and narrow wings secured to inner surface running from said air hole to the bottom of cylinder substantially as shown.

LA FAYETTE LILLARD.

Witnesses:
E. E. MOULREY,
R. A. CARR.